United States Patent [19]
Wan et al.

[11] Patent Number: 6,090,755
[45] Date of Patent: Jul. 18, 2000

[54] USE OF BISMUTH COMPOUNDS IN EXTREME PRESSURE GREASE LUBRICANT COMPOSITIONS FOR ROLLING BEARING APPLICATIONS WITH EXTENDED SERVICE LIFE

[75] Inventors: George Tin Yau Wan, Houten; Dick Meijer, Nieuwegein; Bo Olov Jacobson, Zeist; Herman Lankamp, Bunnik, all of Netherlands

[73] Assignee: SKF Industrial Trading & Development Company, B.V., Nieuwegein, Netherlands

[21] Appl. No.: 08/725,899

[22] Filed: Oct. 4, 1996

Related U.S. Application Data

[63] Continuation-in-part of application No. 08/411,579, Mar. 28, 1995, abandoned, and application No. 08/526,175, Sep. 11, 1995, Pat. No. 5,874,391.

[30] Foreign Application Priority Data

Mar. 28, 1994 [NL] Netherlands ............................ 9400493
Sep. 9, 1994 [EP] European Pat. Off. ................ 9420261
Mar. 12, 1996 [NL] Netherlands ............................ 1002587

[51] Int. Cl.[7] ..................... C10M 119/02; C10M 117/02; C10M 129/30; C10M 129/38
[52] U.S. Cl. ............................ 508/108; 508/591; 585/10; 585/12
[58] Field of Search .................................... 508/108, 591; 585/10, 12

[56] References Cited

U.S. PATENT DOCUMENTS

| | | | |
|---|---|---|---|
| 2,228,500 | 1/1941 | Bergsteom | 252/39 |
| 2,288,288 | 6/1942 | Lincoln | 252/17 |
| 2,901,432 | 8/1959 | Morway et al. | 585/12 |
| 2,917,458 | 12/1959 | Morway et al. | 585/12 |
| 3,028,334 | 4/1962 | Wilson | 252/35 |

(List continued on next page.)

FOREIGN PATENT DOCUMENTS

| | | |
|---|---|---|
| 699334 | 12/1964 | Canada . |
| 905924 | 7/1972 | Canada . |
| 0556404A1 | 8/1993 | European Pat. Off. . |
| 0 675 192 A1 | 10/1995 | European Pat. Off. . |
| 0700986 | 3/1996 | European Pat. Off. . |
| 2162016 | 7/1973 | France . |
| 6-322436 | 11/1994 | Japan . |
| 827538 | 7/1981 | U.S.S.R. . |
| 1384603 | 3/1988 | U.S.S.R. . |
| 799465 | 10/1956 | United Kingdom . |
| 795811 | 5/1958 | United Kingdom . |
| 809731 | 3/1959 | United Kingdom . |
| 1322699 | 7/1973 | United Kingdom . |
| WO94/24100 | 10/1994 | WIPO . |

OTHER PUBLICATIONS

Egorenkov, SU1384603–A, Abstract. May 26, 1986.
Chemical Abstracts, vol. 78, No. 14, Apr. 9, 1973, Columbus, Ohio, US; Abstract No. 86956m.
Chemical Abstracts, vol. 78, No. 14, Apr. 9, 1973, Columbus, Ohio, US; Abstract No. 86955k.
Chemical Abstracts, vol. 101, No. 21, Nov. 19, 1984, Abstract No. 194779h, Kusochkin, V., YA et al "Effect of Lubricating Grease On Operating Characteristics of Enclosed Roller Bearings".
NLGI Spokesman, vol. 52, No. 2, pp. 50–57, May, 1993, "Bismuth—A New Metallic But Non–Toxic Replacement for Lead in EP–Additive In Greases", Rohr et al.

*Primary Examiner*—Margaret Medley
*Attorney, Agent, or Firm*—Oliff & Berridge, PLC

[57] ABSTRACT

The use of bismuth-compounds in an extreme pressure grease lubricant composition for rolling bearing applications can extend the useful service life of rolling bearings. The bismuth can be used as an additive, preferably an EP additive, or as a soap or non-soap thickener. The invention further relates to a method for preparing an extreme pressure lubricant composition in which a bismuth containing soap or thickener is mixed with an oil and optionally one or more EP- or other additives.

24 Claims, 6 Drawing Sheets

U.S. PATENT DOCUMENTS

| | | |
|---|---|---|
| 3,076,764 | 2/1963 | Hansen et al. . |
| 3,114,708 | 12/1963 | Morway et al. .......................... 585/10 |
| 3,216,935 | 11/1965 | Morway et al. ........................ 508/591 |
| 3,290,244 | 12/1966 | Polishuk et al. . |
| 3,392,119 | 7/1968 | Mitacek . |
| 3,502,579 | 3/1970 | Johns ........................................ 252/12 |
| 3,505,222 | 4/1970 | Niebylski ................................. 252/17 |
| 3,663,726 | 5/1972 | Waring ..................................... 252/35 |
| 3,839,209 | 10/1974 | Hermann et al. . |
| 3,850,828 | 11/1974 | Dodson et al. .......................... 585/10 |
| 4,029,682 | 6/1977 | Foulks, Jr. ............................... 252/17 |
| 4,216,270 | 8/1980 | Lawless et al. .......................... 252/12 |
| 4,435,299 | 3/1984 | Carley et al. ........................... 508/512 |
| 4,915,856 | 4/1990 | Jamison .................................... 252/12 |
| 5,139,425 | 8/1992 | Daviet et al. . |
| 5,266,225 | 11/1993 | Hall et al. ................................ 252/35 |
| 5,385,683 | 1/1995 | Ransom .................................... 252/35 |

USE OF BISMUTH COMPOUNDS IN EXTREME PRESSURE GREASE LUBRICANT COMPOSITIONS FOR ROLLING BEARING APPLICATIONS WITH EXTENDED SERVICE LIFE

This is a Continuation-in-Part of application Ser. No. 08/411,579, filed Mar. 28, 1995, now abandoned and application Ser. No. 08/526,175, filed Sep. 11, 1995, now U.S. Pat. No. 5,874,391.

BACKGROUND OF THE INVENTION

The present invention relates to the use of bismuth-compounds in extreme pressure grease lubricant compositions for application in rolling bearings.

The invention further relates to a bismuth-additive containing, polymer-thickened grease composition for use in rolling bearings.

Generally, in cases wherein rolling bearings operate under extreme loading conditions and with long service intervals, extreme pressure grease lubricants are applied in order to make sure that an appropriate amount of lubricant film is always available within the bearing, in particular on the raceways and rolling elements thereof.

Such extreme pressure lubricant compositions generally contain an oil, a soap thickener, one or more EP additives and optionally further additives. The EP additives form a friction-reducing film on the metal surfaces of the bearing, usually due to a chemical reaction of the additives with the surface metals. The function of the supplied lubricant extreme-pressure additives is to minimize wear and to prevent scuffing and welding between contacting surfaces. As such, lead/sulfur-containing additives can be used.

However, these lead additives are not acceptable because of their toxicity and from an environmental viewpoint. Therefore, the lead/sulfur-containing additives are now usually replaced by sulfur/phosphorous EP additives. However, it has now been found that these sulfur/phosphorous additives reduce the service life of the bearings.

Extreme pressure lubricant compositions also contain a soap thickener, such as lithium 12-hydroxy stearate, which provides the grease with the desired physical and chemical structure. The grease should be able to maintain this structure in the bearing as long as possible under high temperature, vibratory and mechanical shearing action.

In this respect, it is necessary to maintain the mechanical stability of the soap or thickener of the grease during extended periods. As long as this soap structure can be maintained, the grease is able to hold in place the oil component which can regularly provide the lubricating properties.

In cases where the soap structure is damaged the grease is no longer able to hold the oil in place, which will then drain away out of the bearing. As a consequence the lubricating properties of the grease are lost and the bearing service life is reduced considerably if the grease is not replenished at short intervals. Furthermore, the grease should be chemically non-aggressive with respect to the metal parts of the bearing (contacts), in particular with the above environment with high temperatures and vibration.

In these respects the lead/sulfur- and sulfur/phosphorous EP additives containing grease lubricant compositions according to the state of the art are not satisfactory. The aim of the invention is therefore to obviate these disadvantages.

Ransom, U.S. Pat. No. 5,385,683, discloses a lubricant composition, moving metal parts, a method for reducing friction, as well as a method for preparing a composition comprising an oil, a bismuth containing compound and other additives. However, Ransom relates to lubricating oils, not lubricating greases.

Also, Ransom describes the use of a combination of a bismuth additive and a tin additive, which react to form a bismuth/tin alloy, which coates the bearing surfaces. According to the present application, no tin additive is present, and such an alloy cannot be formed.

Furthermore, Ransom is directed to reducing friction and wear in sliding metal contacts, i.e. metals moving with respect to one another. Ransom does not relate to the specific problems of roller bearings: the Timken bearing test used in the Examples measures wear in sliding contacts, as discussed below.

U.S. Pat. No. 5,266,225 (Hall) describes a number of bismuth compounds (soaps) for use as EP additives, leading to reduction of wear and improved lubricity in moving metal parts, such as pistons, piston rings etc. of automotive engines.

Hall does not relate to roller bearing applications, nor is any beneficial effect on the useful service life of roller bearings mentioned or suggested. For instance, in example 7, Hall uses the standard Timken-test, which measures wear in sliding contacts.

Also, Hall mainly relates to bearings operated under sandy conditions whereby the bismuth compounds provide a protective film on the sand and grits which prevents wear.

U.S. Pat. No. 3,028,334 (Wilson) describes the use of gamma-ray absorbing compounds in a preparation of lubricants resistant to atomic radiation, for which purpose no specific preference for bismuth over for instance titanium, molybdenum, mercury or lead is given. Also, the use of bismuth compounds for improving the useful service life of greased roller bearings is neither described nor suggested.

A grease containing a bismuth additive is also known from NLGI SPOKESMAN, Vol. 57, Nr. 2, May 1993, O. ROHR "Bismuth, a new metallic but non-toxic replacement for lead as EP additive in greases", pages 6.50–13.57. In this article, it is described that a bismuth additive promotes the formation of a film on the rolling bearing metal surfaces and therefore could serve as a replacement for lead as extreme pressure additive in grease. The bismuth additive indeed appears to offer even better lubricating properties than a lead additive, in particular under high load, high temperature and high sliding speed conditions. Also it is mentioned that the organobismuth compound functions as a corrosion inhibitor and as an antioxidant.

However, this article is silent with respect to the field of the present invention, that is the provision of an extended useful service life of the greases and thus the bearing (fatigue) life. Whereas it is reported that the bismuth additive beneficially influences the lubricating properties of the oil component of the grease, no reference is made to any favourable effects on bearing service life.

Also, both the Timken test and the Shell four ball test used by Rohr measure friction and wear during brief periods of time, i.e. until the "welding point" is reached where the bearing surfaces melt together under pressure and frictional heat.

The application of bismuth additives in a lubricant is also addressed in SU-A-1384603 by Egorenkov et al. Here, the bismuth is added to lubricating oil compounds for sliding contact surfaces, i.e. "for metal and metal-polymer friction pairs".

Although it is stated that the bismuth additives reduce the friction in a sliding contact, no reference is made to roller element bearings or to achieving an extended service life thereof. i.e for instance as a result of improved lubricant life or improved fatigue life. Furthermore, Egorenkov teaches bismuth additives only in combination with cadmium-additives, such as a combination of cadmium oleate or stearate and bismuth oleate or stearate.

In general, the above prior art teaches the use of bismuth compounds for reducing friction and wear, i.e. abrasive and/or adhesive wear. This is generally associated with sliding contacts, i.e. metal surfaces moving with respect to each other.

The present invention is particularly concerned with rolling contacts in roller/rolling bearings. In such ball-type bearings, sliding contacts are minimal and friction and wear are generally low under well lubricated conditions, which is also independant of the type of grease lubricant used. Therefore, in rolling element bearings, under conditions of high bearing temperatures and high contact stress at normal speed, or under conditions of high temperatures and high speed at low load, friction and wear are not of concern, even with prior art sulfur/phosphorous or sulfur/lead additives.

However, in roller bearings under the abovementioned conditions, after at least tens to more than a hunderd hours of continous operation, stress corrosion, fatigue and pitting of the bearing surfaces can become a problem, as well as reduction of grease life; these are some of the main problems addressed by the present invention.

In comparison, friction and wear are problems which occur immediately once the bearing is put into operation. Generally, if friction and wear due to sliding contacts were to be a problem in rolling element bearings, such bearings would fail immediately (i.e within hours) because the heat of friction would destroy the bearing, i.e. by fusing the bearing surfaces.

However, because there is little sliding in ball bearing contacts, especially between the raceway and the ball, after long periods of operation, other kinds of mechanisms for inducing bearing failure become relevant, in particular fatigue and pitting, as well as grease failure. (In sliding contacts, friction and wear would destroy the bearing long before the grease fails.)

Therefore, fatigue phenomena, such as stress corrosion induced fatigue in roller bearings, which are reduced according to the invention, are not related to the problems of friction and wear in sliding contacts addressed by the above art. This is also evident from the fact that tests for measuring friction and wear used in said art, such as ASTM D-1743 and the Shell-4-ball test (ASTM D-2596) mentioned by Rohr, as well as the Timken test described by Ransom and Hall, are suitable only for measuring friction and wear in sliding contacts during brief periods of time (i.e. 1–10 hours before the bearing fails); such tests cannot be used for measuring service life or bearing/grease failure in the context of the present invention, for which tests lasting tens or hunderds of hours are required, such as the "Deep groove ball bearing (DGBB 6206 2RS1)" test or the "taper roller bearing (580/ 572)" test described in the Examples hereinbelow.

For instance, the Timken bearing test used in the Examples of Ransom measures wear, i.e. at very low speeds and at very low temperatures (290 rpm and 150° F.=65° C., vide the tables). Also, said Timken-test is run over a period of maximum 240 minutes (vide the figures), which is insufficient to measure the grease failure and/or fatigue failure effects the present invention tries to overcome, which take hunderds of hours to develop.

Also, both the ASTM-D-1743 test and the Shell four ball test used by Rohr measure friction and wear during brief periods of time, i.e. until the "welding point" is reached where the bearing surfaces melt together under pressure and frictional heat.

Also, although Rohr measures "corrosion" in Table 3, this is measured in a standard EMCOR test, which measures water corrosion, not stress corrosion under the operating conditions of the invention as set out above. Also, the known "free"-sulfur containing greases give good corrosion protection in the Emcor test, whereas a free sulfur content is detrimental under the conditions of the invention, as further discussed hereinbelow.

Therefore, the present invention particularly relates to improved service life and grease life in a roller element bearing under conditions of high bearing (outer ring) temperatures (e.g. 80–130° C.) and high contact stress (e.g. C/P=2–15) and normal bearing rating speeds; or under conditions of high speeds (e.g. NDM: 700,000 to 1.5 millions) and low load (e.g. C/P>15) and high temperature (e.g. 80–130° C.), and during long periods of operation (e.g. more than 50, preferably more than 100, more preferably more than 200 hours).

At these conditions of high temperature and high pressure, during long continuous operation, the chemical reactivity of the additives in the grease become very important. "Free" sulfur containing of releasing additives, such as the known lead/sulfur-or sulfur/phosphorous EP additives. will attack both the bearing surfaces, thereby promoting fatigue, such as induced by stress corrosion phenomena, as well as the grease structure itself (i.e. the thickener), leading to reduced grease life, reduced oxidation life and reduced mechanical/shear stability.

According to the present invention, stress corrosion and fatigue of the bearing surfaces is reduced, also, oxidation life and shear stability at high temperatures are improved, both factors extending the service life of the grease and the bearing. These factors affecting the bearing life are not a problem in sliding contacts, as the bearing surfaces will be destroyed by friction and wear long before the grease structure fails.

SUMMARY OF THE INVENTION

Therefore, according to the invention in one of its broadest embodiments, bismuth compounds are used in extreme pressure grease lubricant compositions for rolling bearing applications to extend the useful service life of the bearing and/or the life of the grease present in the bearing, and thereby to increase the relubrication intervals required, compared to known, non-bismuth additive containing grease compositions.

In a first aspect, the invention therefore relates to the use of bismuth compounds in an extreme pressure lubricant for rolling bearing applications as an additive for extending the useful service life of rolling bearings.

In a further aspect, the invention relates to a bismuth-additive containing, polymer-thickened grease composition for use in rolling bearings.

In yet a further embodiment, the invention relates to a method for extending the useful life of an extreme presuure lubricant composition, and thereby the relubrication intervals of a rolling element bearing lubricated with such a composition, comprising:

preparing a first extreme pressure grease lubricant composition comprising an effective service life extending amount of at least one bismuth-containing compound;

identifying effective service lives of said first extreme pressure grease lubricant composition and of a second extreme pressure grease lubricant composition wherein said at least one bismuth-containing compound of said first extreme pressure grease lubricant composition is replaced by a non-bismuth-containing compound; and treating a rolling element bearing with said first extreme pressure grease lubricant composition for a period of time at least longer than the effective service life of said second extreme pressure grease lubricant composition.

The invention also relates to a method for extending the service life of a rolling element bearing comprising:

preparing a first extreme pressure grease lubricant composition comprising an effective service life extending amount of at least one bismuth-containing compound;

identifying effective service lives of said rolling element bearing treated with said first extreme pressure grease lubricant composition and of said rolling element bearing treated with a second extreme pressure grease lubricant composition wherein said at least one bismuth-containing compound of said first extreme pressure grease lubricant composition is replaced by a non-bismuth-containing compound; and treating said rolling element bearing with said first extreme pressure grease lubricant composition for a period of time at least longer than the effective service life of said rolling element bearing treated with said second extreme pressure grease lubricant composition.

In all these aspects of the invention the presence of bismuth compounds has a favourable influence on the useful service life as well as the grease life of greased rolling bearing applications.

DETAILED DESCRIPTION OF THE INVENTION

Figure 1:
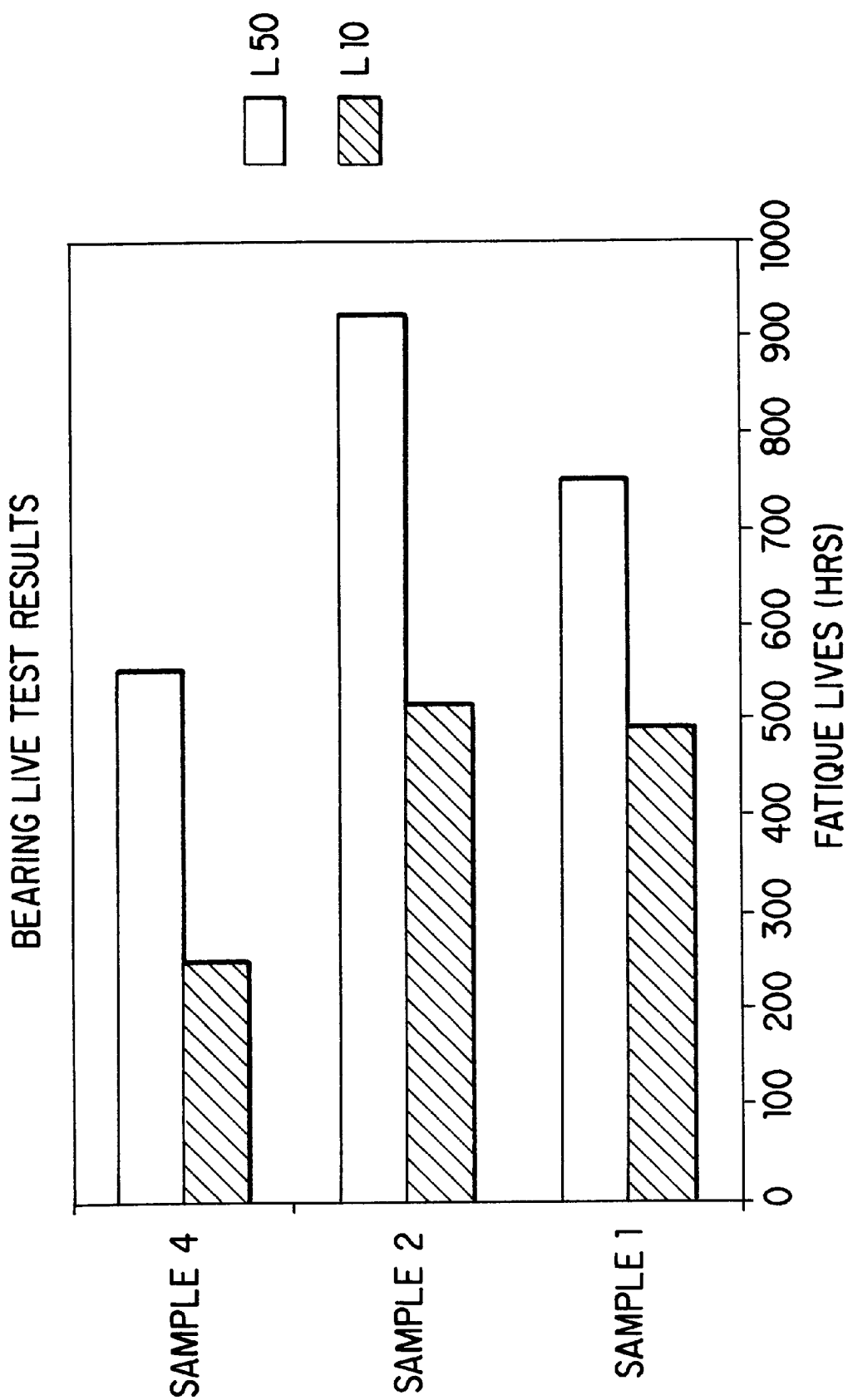
FIG. 1 shows the influence of bismuth additives on bearing life

According to the present invention, a bismuth containing additive and especially an EP additive, a bismuth containing soap, or both can be used. When a bismuth containing soap is used it is not strictly necessary to use Bi-containing or other EP-additives.

In particular, the bismuth additive can be any organobismuth compound suitable for use as an additive, especially an EP-additive, or a soap-thickener in lubricant grease compositions, i.e.

the bismuth compound can be any EP additive, fully or partially replacing the known EP additive in the grease composition;

the bismuth compound can be a bismuth soap, fully or partially replacing the known metal soap in the grease composition;

the bismuth compound can be a further bismuth containing additive, which is added in addition to a known EP additive and a known metal soap.

Therefore, the grease lubricant composition being used in the claimed method is similar to the prior art grease lubricant compositions, but includes a bismuth-containing compound as one of its components.

In general, the bismuth compounds of the invention are similar to the known metal containing additives, in which said metal is replaced by the metal bismuth. Such bismuth compounds are known in the art, such as the above-mentioned art, or can be obtained in a manner analogouds to those known per se for equivalent non-bismuth compounds. Therefore, in the method of the invention, in general, the metal bismuth is substituted for another metal present in the traditional grease lubricant composition components.

As to additives in general, it is well known in the art to add any of numerous additives to a grease or lubricant composition. For example, U.S. Pat. No. 5,281,346 generally describes such additives as dispersants, detergents, antioxidants, anti-wear agents, extreme pressure agents, emulsifiers, demulsifiers, foam inhibitors, friction modifiers, anti-rust agents, corrosion inhibitors, viscosity improvers, pour point depressants, dyes, lubricity agents, and solvents (col. 22, lines 54–66). U.S. Pat. No. 5,264,005 proviedes detailed descriptions and examples of such additives as viscosity index improvers, corrosion- and oxidation-inhibiting agents, coupling agents, pour point depressing agents, extreme pressure agents, antiwear agents, color stabilizers and anti-foam agents (col. 28, line 60 to col. 30, line 23). Similar disclosures may also be found in U.S. Pat. No. 4,995,995 (col. 2, lines 28–49) and U.S. Pat. No. 4,957,651 (col. 2, line 49 to col. 15, line 2 citing some 84 other U.S. Patents). With specific reference to grease compositions, U.S. Pat. No. 5,246,604 describes that various agents have been employed to improve the antiwear and extreme pressure properties of greases, and that alkali-metal borate containing agents are well known in the art for their usefullness as extreme pressure agents in greases (col. 1, lines 24–34, citing three additional U.S. Patents).

Non-soap thickeners are, for example, disclosed in U.S. Pat. Nos. 5,217,635 (col. 5, lines 34–42), 5,002,674 (col. 4, line 50 to col. 5, line 2), 4,587,026 (col. 3, line 65 to col. 4, line 20), and 4,428,861 (col. 3, lines 10–22). Each of these patents also generally discloses soap thickeners as being known in the art.

Other exemplary U.S. Patents that describe soap thickeners well-known in the art include: U.S. Pat. No. 5,200,099 (col. 2, lines 39–47), U.S. Pat. No. 5,133,887 (col. 1, lines 16–18 and col. 2, lines 14–19), U.S. Pat. No. 5,084,193 (col. 1, lines 24–59), and U.S. Pat. No. 5,015,401 (col. 1, lines 14–33). The entire disclosure of each of the above-identified U.S. patents is incorporated herein by reference.

Of course, whatever the type of bismuth compound, especially organo-bismuth compound, used, it must be compatible with the other components of the grease composition.

For economical reasons, in order to avoid the need for adding further additives besides the soap thickener and the EP additive, preferably a bismuth containing EP additive and/or a bismuth containing soap is used in the present invention.

When a bismuth containing soap according to the invention is used, this soap is usually a bismuth-salt of a fatty acid with 10–30 carbon atoms or a derivative thereof. Usually the bismuth analogues of known soap-thickeners are used, in which the bismuth replaces the metal, i.e. barium, aluminium, calcium, lithium, sodium, strontium etc. Examples are bismuth stearate, bismuth tri-stearate, bismuth tripalmetate, bismuth trioleate and derivatives thereof, such as 13-bismuth 12-hydroxy stearate. The bismuth soap can contain the same or different fatty acid groups. Also mixtures of bismuth containing soaps can be used.

The bismuth containing soap is used in the usual amounts, depending upon the desired properties of the final lubricant composition. In general, this amount will vary between 5–14% by weight of the total composition for a "soft" grease to 15–25% by weight of the total composition for a "stiff" grease.

The bismuth containing soap can also be used in combination with known soaps containing other metals, such as lithium-soaps or calcium-soaps in a grease formulation. This will reduce the costs of the final extreme pressure lubricant composition.

When the bismuth compounds are used as EP additives, these compounds are in general bismuth carboxylates of the formula $(R—CO_2)_3Bi$, in which R is a branched, straight or cyclic alkyl group with 1–30 carbon atoms or an aryl, alkaryl or aralkyl group with 5–20 carbon atoms. Paraffinic bismuth carboxylates with 6–10 carbon atoms or naphthenic bismuth carboxylates are preferred, such as bismuth naphthenate and bismuth octoate.

However, the use of bismuth compounds as EP additives according to the invention is not limited to the bismuth compounds mentioned above, and other organo bismuth compounds can be used, such as the bismuth containing additives known from the above prior art, or compounds analogous to known lead/sulfur-EP additives, in which the lead is replaced by bismuth.

In the practice of the invention, regardless of whether the bismuth compound used is in the form of an additive, especially an EP-additive, or in the form of a bismuth soap, the extreme pressure grease lubricant composition is most preferably substantially free of compounds which, under the bearing operating conditions, can provide or release "free" sulfur atoms or radicals, as well as hydrogen atoms or radicals, or which decompose to form such atoms/radicals, which can attack the grease and/or the bearing surfaces.

The formation of such reactive sulfur- and/or hydrogen-species from the known lead/sulfur and sulfur/phosphorous EP-additives and their subsequent reaction with the metal surfaces in the bearing, especially with the metallic iron-content therein, to form a "coating" of (primarily) iron/sulfur-compounds on the bearing surfaces, are well known in the art. In fact, with such conventional additives, these reactions are desired, as the formation of such a sulfide "coating" is one of the primary mechanisms via which said conventional additives work.

According to the invention, the formation of such active sulfur-species is most preferably avoided. On the one hand, this means that the lubricant grease composition containing the bismuth compounds as described above preferably do not contain any (further) additives which can release such "free" sulfur. On the other hand, it means that the bismuth-compounds used, especially when used as a bismuth-additive or EP-additive, themselves preferably also do not provide or release, or decompose to form, "free" sulfur atoms or radicals.

Therefore, bismuth additives analogous to the abovementioned lead/sulfur or sulfur/phosphorous additives, in which the lead or phosphor content has been replaced by a bismuth content, are not preferred in the practice of the invention. This can also be seen in Table 3 of the application, which shows that Sample 1, containing an organobismuth and sulfur additive, shows a fatigue failure of "5", whereas the non-"free" sulfur containing bismuth greases of Samples 2 and 3 show a fatigue failure of 1 or 2.

Also, according to a further embodiment of the invention, the said extreme pressure grease lubricant composition is substantially free of toxic heavy metals or organometallic compounds containing heavy metal atoms. In particular, the extreme pressure grease lubricant is essentially free of tin and cadmium compounds, such as the additives described in Ransom and Egorenkov.

The bismuth containing EP additives are used to partly or completely replace known EP additives, such as lead/sulfur additives or sulfur/phosphorous additives in extreme pressure lubricant compositions.

When the bismuth compound is used as an EP additive it can be added to the soap, the oil or to the already formed mixture of the oil and the soap thickener. Usually and preferably the additive is admixed with the oil.

The bismuth containing EP additives are used in the usual amounts, in general the amount of bismuth will be 0.1–5% by weight of the total lubricant composition. Mixtures of one or more bismuth compounds can be used, optionally in admixture with one or more other EP additives. Further conventional additives for lubricant compositions can be used in usual amounts, if desired.

The bismuth containing EP additives can be soluble or non-soluble in the oil component of the lubricant composition.

The bismuth containing EP additives can also be used in extreme pressure lubricant compositions, which contain for instance non-soap thickeners, such as polyurea-based compounds, polytetrafluorethylene or silicone as a thickener instead of a soap.

The invention can also be used with inorganic non-soap thickeners, such as clay or silica thickeners well known in the art, vide for instance Dutch patent no. 8105184, incorporated herein by reference.

With all the thickeners described herein, the greases containing a bismuth additive in accordance with to the invention will generally be similar in properties, such as consistency, mechanical staiblity and other lubricant properties, to the equivalent known greases not containing bismuth additives; however, the greases containing a bismuth additive in accordance with to the invention will contain at least one bismuth compound and will give the advantageous properties with respect to grease life, bearing (fatigue) life, service life and relubrication described above.

The bismuth containing additives can be used with particular advantage in polymer thickened lubricating greases, such as the polymer thickened lubricating greases described in U.S. Pat. No. 3,850,828 and U.S. Pat. No. 3,392,119, both incorporated herein by reference.

In a particularly preferred embodiment, the bismuth additives are used to improve the service life and the grease life of a grease lubricated roller element bearing by using/incorporating the bismuth additives in a polymer-thickened grease composition as described in the copending U.S. Ser. No. 08/526,175 to Meijer, Jacobson and Lankamp, assigned to the same assignee as the present application, which is incorporated herein by reference. Said bismuth-additive containing, polymer-thickened grease composition is then applied as a lubricant to a roller element bearing in a manner known per se.

According to this embodiment, the invention particularly relates to a polymer-thickened grease composition, comprising a lubricating oil, a polymeric thickener according to Ser. No. 08/526,175, incorporated herein by reference, a bismuth additive as described above, especially a bismuth containing EP-additive, and optionally further additives known per se, such as antioxidants and corrosion inhibitors suitable for use in lubricant grease compositions.

In this preferred embodiment, the polymeric thickener comprises a high molecular weight component comprising a (co- or homo-)polymer of propylene with a weight average molecular weight >200.000, preferably 200.000–500.000 and a low molecular weight component comprising a (co- or homo-) polymer of propylene with a weight average molecular weight ≦100.000, preferably 50.000–100.000.

The weight ratio between the high molecular weight component and the low molecular weight component in the polymeric thickener is preferably 1:40–1:5, more preferably 1:25–1:15, more preferably about 1:19.

The low molecular weight component is preferably a polypropylene homopolymer, more preferably a polypropylene homopolymer with a melt flow rate of 500–1000 dg/min., especially 750–850 dg/min. as determined by test ASTM D 1238 L.

The high molecular weight component preferably has a melt flow rate (ASTM D-1238) of 1.5–15, more preferably 1.5–7, especially about 3.5.

As the lubricating base oil any lubricating oil known per se may be used, such as mineral oils, synthetic hydrocarbons, ester oils and mixtures thereof, of different viscosity. The type of base oil and viscosity can be selected to suit specific applications.

Furthermore, additives known per se may be incorporated in the lubricant grease composition, as long as they do not have a detrimental effect on the thickener composition, the base oil and/or the final grease composition. As such, anti-wear and anti-corrosion additives as well as antioxidants etc. may be incorporated in conventional amounts in a manner known per se.

Suitable antioxidants will be known to a man skilled in the art and include the Irganox$^R$-series antioxidants of Ciba-Geigy, such as Irganox L-57, as well as Vanlube$^R$ NA and Vanlube$^R$ 81, both of R. T. Vanderbilt Industries. Irganox L-57 is especially preferred in the context of the present invention, in particular for use with the above-indicated polymeric thickener.

Suitable corrosion inhibitors will be known to a man skilled in the art and include "ashless" corrosion inhibitors such as Vanlube$^R$ RI-G of R. T. Vanderbilt Industries, as well as other types of corrosion inhibitors, such as the calcium based inhibitor Vanlube$^R$ RI-CA, also of R. T. Vanderbilt Industries. In the context of the present invention, in particular for use with the above-indicated polymeric thickener, ashless inhibitors, and in particular Vanlube$^R$ RI-G, are especially preferred.

The polymer thickener according to the invention is generally used in the lubricating grease composition in conventional amounts, i.e. from 1–20, preferably 5–15, especially about 10 percent by weight of the total grease composition. Other amounts can be used if desired.

The bismuth containing additive will usually be present in the amounts mentioned above, i.e. 0.1–5 wt. %, especially 0.5–3 wt. %, calculated on the total amount of bismuth present in the composition. This means that the additives will usually be incorporated in amounts of 0.5–20 wt. % of the total composition, depending upon the Bi-content of the additive itself. For instance, the bismuth additives described hereinbelow are usually added in amounts of 2–15, preferably 3–10, in particular around 5–6 wt. % of the total composition, the latter giving a bismuth content in the composition of around 1 wt. %.

The lubricating base oil will be present in a conventional amount suited for making a grease, and will make up the remainder of the grease composition to 100 wt. %. Suitable amounts are i.e. 40–99 wt. %, preferably 70–90 wt. %, in particular around 80–85 wt. %.

Apart from the polymeric thickener, the bismuth-additive containing, polymer-thickened grease composition may also contain conventional thickeners for lubricant grease compositions, such as metal soaps, especially bismuth-soaps, in minor amounts of less than 50 wt. %, preferably less than 10 wt. %, as well as other polymeric thickeners.

Also, for increasing the dropping point (DIN ISO 2176), a high melting point polymeric component with a melting point (ASTM D-2117) of more than 200° C., especially more than 225° C. can be added in a suitable amount of between 10 to 90 wt. %, preferably 75–55 wt. %, of the thickener, in order to provide a bismuth-additive containing, polymer-thickened grease with a dropping point of more than 150° C., preferably 180–220° C. For the preparation of such compositions, the grease preparation temperature should be adapted accordingly to above the melting point of the polymeric thickener.

However, preferably, and in order to reduce the number of components in the composition and thereby overall cost, the bismuth-additive containing, polymer-thickened grease composition only comprises the lubricating base oil, the polymeric thickener, the bismuth-additive, especially the bismuth EP-additive, and a suitable antioxidant. Furthermore, for use in humid conditions, the grease can also contain a suitable anticorrosion inhibitor.

The bismuth-additive containing, polymer-thickened grease composition are preferably prepared by the method described in Ser. No. 08/526,175, which comprises the following steps:

(a) preparing a polymeric thickener composition according to the invention;

(b) mixing the obtained thickener composition with one or more lubricating base oils at a temperature above the melting point of the polymeric thickener composition, e.g. 150–250° C., preferably 190–210° C.; and (c) cooling the grease composition thus obtained.

The polymeric thickener can be prepared by mixing the polymers in a manner known per se, which can optionally involve heating and/or the use of suitable solvents.

The polymers are mixed with a lubricating base oil, the one or more bismuth additives, and the optional additives by means of conventional techniques known per se resulting in the lubricating grease composition according to the invention.

The preparation of the bismuth-additive containing, polymer-thickened grease composition should preferably be carried out under a protective atmosphere, such as a nitrogen gasflow, for avoiding oxidation of the oils during heating.

According to a preferred embodiment the solid polymeric components and the lubricating base oil are heated together (preferably under stirring) to a temperature above the melting point of polypropylene, preferably 190–210° C., although other temperatures may be used if required.

In this respect, it should be noted that EP-additives which can provide or release "free" reactive sulfur species as described above, i.e. the known lead/sulfur or sulfur/phosphorous additives or their bismuth analogues, are not suited for this purpose, as they would chemically attack and even (fully) decompose the polymeric thickener at the required grease preparation temperatures (190–210° C). Thus, in this embodiment, it is preferred that the additives be such that they do not provide or release such "free" reactive sulfur (and/or hydrogen), or at least substantially so.

After the polymers are dissolved in the lubricating base oil, and the bismuth additive(s) and optionally further additives are added, the grease is cooled from the mixing temperature to room temperature.

Most preferably, this cooling is carried out in a period of time between 1 sec.–3 min., preferably 10 sec.–1 min., more preferably about 30 sec. This rapid cooling process, which forms an important aspect of the preparation of the polymer-thickened grease, will be indicated hereinbelow as "quenching". The quenching of the lubricant grease composition can be carried out, for instance, by pouring the grease composition on a water-cooled metal plate, although any other suitable rapid cooling method may also be used, such as spraying.

The quenching process according to the invention has a major influence on the grease structure, giving significant improvement of the properties of the final grease compositions compared to both conventional lubricating greases, as well as similar polymer-thickened lubricating greases which are cooled slowly, e.g. in approximately 1 degree per minute by the use of conventional cooling methods, such as simply keeping the grease in the reaction vessel with external/internal cooling. This results, for the polymer grease, in a lubricant lacking any mechanical stability.

In the bismuth-additive containing, polymer-thickened lubricating grease according to the invention, the polymeric thickener forms a sponge-like structure, which gives the grease its appearance and structure. The lubricating base oil is kept within the pore-like spaces within the thickener structure, and bleeds out during service of the grease. It is believed that the bismuth compound also has a beneficial influence on said thickener structure.

After the grease lubricant composition is cooled, preferably quenched, the grease is "worked" to the required final consistency in a conventional manner, for instance in a three-roll mill or a grease worker. During the working of the grease, further additives can be added as is well known to a man skilled in the art. After "working", the grease is ready for use.

Preferably, the grease will have a penetration after the Shell roll stability test (24 hrs at 60° C., 165 rpm), of max. 350.

The consistency of the grease can be classified by means of the NLGI-class. The bismuth-additive containing, polymer-thickened lubricating grease can usually be prepared to a NLGI-class range 1 to 3. An NLGI-class of 0 can be made, however, will usually give undue grease leakage.

The bismuth-additive containing, polymer-thickened lubricating grease compositions of the invention will have all the advantages connected with the use of the polymeric thickener, i.e. as described in Ser. No. 08/526,175. In particular, these advantages include improved bleeding of the oil at low temperatures (room temperature [20° C.] or less);

oil bleeding characteristics that are less temperature-dependent than the characteristics of lubricant grease compositions known in the state of the art;

better transport of the oil within the grease structure, which leads to improved grease service life;

good lubricating ability at low temperatures (below 70° C.);

good mechanical stability, i.e. "roll" stability/shear stability;

improved grease noise characteristics, i.e. a lower noise level of the lubricated bearing in the SKF BEQUIET-test;

Also, as described in Ser. No. 08/526,175, grease compositions thickened with the above polymeric thickener will have longer relubrication intervals compared to conventional soap-thickened grease compositions. By further incorporating bismuth additives in said compositions in accordance with the present application, said relubrication intervals can be extended even further, especially for roller bearing applications as described hereinabove.

However, it will be clear to a man skilled in the art from the disclosure above, in particular in conjunction with the disclosure of Ser. No. 08/526,175, that the abovementioned advantageous properties make the bismuth-additive containing, polymer-thickened lubricating grease compositions of the invention very good "allround" greases. For instance, the combination of excellent low temperature properties, as well as high temperature/high load characteristics described above, make said greases especially suited for general automotive applications, in which the grease/bearing operation conditions can vary widely (i.e. from "cold" starts when starting a motorcar in winter, to high constant and/or peak bearing operating temperatures of 50–150 degrees Celsius or more).

Therefore, it should be understood that, in general, the bismuth-additive containing, polymer-thickened lubricating grease compositions can also be used with advantage in other lubricating applications in a manner known per se besides the preferred roller bearing applications described above.

The invention furthermore relates to a method for preparing an extreme pressure lubricant composition in which a bismuth containing soap or thickener is mixed with an oil and optionally one or more EP- or other additives. The mixing of the soap, the oil and the thickener can be carried out in a manner known per se for the preparation of EP greases from the prior art. Preferably, a bismuth containing EP additive as mentioned above is used. The bismuth containing soap, the oil and the EP additives and other additives are used in the usual amounts.

According to the invention it has been found that the favourable effect of the use of bismuth compounds on the useful service life is mostly due to the improved mechanical, physical and chemical stabilities of the grease (the oil/thickener composition). In contrast to the friction reducing "surface effects" mentioned above, this "bulk effect" has not been described in the prior art. The exact mechanism thereof is not known, however, the beneficial influence of the presence of bismuth compounds is obtained with both bismuth containing soaps and with bismuth containing EP additives.

The bearing service life is further increased by the favourable influence of the bismuth additive on stress corrosion and fatigue life.

Moreover, the replacement of lead by bismuth is an improvement having regard to the non-toxic properties of the latter.

In its preferred embodiment, the present invention relates to a bismuth additive-containing, polymer-thickened grease composition, which comprises at least a lubricating oil, a polymeric thickener according to Ser. No. 08/526,175, incorporated herein by reference, a bismuth carboxylate as described above as an EP-additive, and an antioxidant for a lubricant grease composition, said components being present in the amounts of
polymeric thickener:
5–50, preferably 10–20, especially about 12.5 wt. %
bismuth carboxylate:
2–15, preferably 3–10, in particular around 5–6 wt. %
antioxidant:
0,01–10, preferably 0.1–5, in particular around 1–2 wt. %
lubricating oil:
40–99, preferably, in particular around 80–85 wt. %.
based upon the total composition and making up 100 wt. %, in which said grease can be used to improve the service life and the relubrication intervals of a grease lubricated bearing, especially a roller element bearing, by incorporating the bismuth additives in a polymer-thickened grease composition as described in the copending U.S. Ser. No. 08/526,175, and applying the bismuth additive-containing, polymer-thickened grease composition thus obtained as a lubricant to a bearing, especially a roller element bearing, in a manner known per se.

In this preferred embodiment, the polymeric thickener comprises

- a polypropylene homopolymer with a weight average molecular of 50.000–100.000 and a melt flow rate of 500–1000 dg/min., especially 750–850 dg/min., determined by test ASTM D 1238 L
- a (co- or homo-)polymer of propylene with a weight average molecular weight 200.000–500.000, and a melt flow rate (ASTM D-1238) of 1.5–15, more preferably 1.5–7, especially about 3.5., the weight ratio between the high molecular weight component and the low molecular weight component in the polymeric thickener being 1:25–1:15, more preferably about 1:19.

The bismuth-additive containing, polymer-thickened grease composition of the preferred embodiment is prepared by the method of "quenching" as described above, to prepare a grease composition with the aboveindicated consistency, stability and properties.

In this preferred embodiment, with advantage, the grease formulation is very "simple", comprising only oil, polymeric thickener, bismuth additive, antioxidant and optionally a corrosion inhibitor as indicated above in an amount of 0,01–10, preferably 0.1–5, in particular around 0.5–1 wt. %.

As mentioned above, the grease of this preferred embodiment does not contain any "free" sulfur releasing compounds, nor any toxic heavy metals, or is at least substantially free of such compounds.

Hereinbelow is given a brief discussion of some of the mechanisms and chemical interactions that might be pertinent to the use of bismuth additives in accordance with the invention. This discussion however in no way limits the invention as described herein or as claimed in the claims.

The interactions between the grease components according to the invention, in particular the bismuth additives and the bearing contacting surfaces, are activated at high bearing temperatures, and not by any frictional heat in sliding contacts. In comparison, the formation of metallic bismuth coatings on the bearing surfaces for reducing friction and wear, such as Ransoms Bi/Sn alloy, is due to very high local temperatures in the sliding contacts caused by frictional heat and high pressure. In roller bearings, these temperatures will be lower. Also, with a bismuth soap, the formation of such alloys or metallic is of course even less likely, as this will degrade the grease structure.

According to the invention, the chemical interaction of the bismuth compounds does not promote fatigue or pitting of the bearing, as do the prior art "free" sulfur containing EP-additives.

Also, at high temperatures, the bismuth additive components have less (destructive and) chemical interaction with the soap or polymer thickener structure, i.e. they give less oxidation and/or degradation, compared to reactive "free" sulfur and/or reactive "free" hydrogen providing or releasing additives.

Also, due to the presence of bismuth, and especially when a bismuth soap is used, also the grease structure is more stable (even with ordinary EP-additives) and the oil is kept in place better inside the thickener structure, compared to usual additives.

Also, the use of bismuth containing EP additives in EP greases in order to provide improved lubricating properties, such as lower friction and wear, as described in the prior art, is based on a "surface" effect: the EP additives react with the metal surfaces of the bearing forming a protective coating thereon. Although friction and wear are important characteristics of greased roller bearings, they are not major factors in determining the service life of the bearing, i.e. the time the bearing can be operated under constant load; this is primarily determined by the stability and the life of the grease present.

According to the present invention, said stability of the grease is improved by incorporating at least one bismuth compound into the grease, in which said bismuth compounds work on the grease itself (a "bulk" effect) and not on the bearing surfaces.

Because said interaction is with the grease structure, and not per se with the bearing surfaces, the bismuth compound used according to the invention does not necessarily have to be an EP additive in the "classical" sense, i.e. an additive which reacts with the bearing surfaces to form a chemical coating thereon, such as the "free" sulfur containing EP-additives mentioned above.

According to the invention, the bismuth compound can (also) be a bismuth soap, fully or partially replacing the known metal soap in the grease composition, or a further bismuth containing additive.

The invention will now be illustrated by means of the following non-limiting example 1, in which the influence on the service life of rolling bearings of three bismuth containing lubricant compositions is compared with a sulfur/phosphorous containing lubricant composition according to the state of the art. Non-limiting example 2 illustrates the preparation of a bismuth-containing soap of the invention.

EXAMPLE 1

Several tests have been carried out in order to demonstrate the effect of a bismuth additive. In these tests, the following samples were used:

Sample 1: Lithium base grease, antioxidant (0.5 wt %)+organo-bismuth and sulphur additive (0.5 wt % Bi) from Miracema, Brazil.

Sample 2: Lithium base grease, antioxidant (0.1 wt %), anti-rust (3.2 wt %), organo-bismuth (0.5 wt % Bi) from Miracema, Brazil or from Pharmacie Centrale de France.

Sample 3: Mineral base oil+antioxidant+(0.5–2 wt % Bi) bismuth carboxylate e.g. Liovac 3024 from Miracema, Brazil.

Sample 4: Fully formulated commercially Litium soap extreme pressure (E/P) grease containing sulphur/phosphorous (S/P) EP additive package.

The grease samples 1, 2 and 4 are further described in Table 2.

Grease samples 1, 2 and 4 above were subsequently applied for bearing life tests under high load and high temperature conditions as listed below in Table 1:

TABLE 1

| | |
|---|---|
| Bearing type | Deep groove ball bearing (DGBB 6206 2RS1) |
| Speed | 2500 rpm |
| Radial load | 6000N |
| Test temperature | 120 ± 2° C. (outer ring) |
| Grease filling | 2, 4 g |
| Strategy | sudden death factor group of 2, in which sets of two bearings are run simultaneously until one of the bearings fails. |
| Type of failure | Bearing noise (fatigue related) Temperature rise (grease failure) |
| C/P | 3, 25 |
| Kappa | 0, 75 (calculated on the base oil rheology and assuming fully flooded conditions). |
| Grease Relubrication | none |

In FIG. 1 the test results are shown. It is clear that the statistical values for L10 and L50 bearing life (which includes both grease life and fatigue life) of grease samples 1 and 2 according to the invention are significantly better than that of sample 4. (L10=time until failure of 10% of the samples in hrs; L50=time until failure of 50% of the samples in hrs).

Further DGBB tests were conducted for a range of greases containing bismuth additives. A bearing sample size of 10 bearings/grease was employed in 5 sub-groups. Bearing test performance was compared between SKF LGEP2 and two experimental formulated greases containing bismuth additives shown in Table 2.

Table 3 shows the bearing life test results of SKF LGEP2 (sample 4) and the two Bi-greases (samples 1 and 2). It shows that the observed L10 life of both bismuth greases is about 2 times longer than the reference grease LGEP2. Based on the statistical hypothesis test procedures, the comparison of L10 life between LGEP2 and the bismuth greases is classed as weakly significant i.e. the probability of significance is greater than 80%, but less than 90%. The test comparison of the L50 life between LGEP2 and sample 3 is statistically significant (i.e. >90% probability).

TABLE 2

| | | Base Oil Viscosity, cSt | | | |
|---|---|---|---|---|---|
| Lubricant | Soap Type | 40° C. | 100° C. | NLGI Grade | Remarks |
| Sample 1* (EP grease containing bismuth additive) | Li-soap | 195 | 15 | 2 | experimental grease (LGEP2 grease without additives) + 0.52 wt % antioxidant + 0.47 wt % Bi additives (L-3089) |
| Sample 2* (EP grease containing bismuth additive) | Li-soap | 195 | 15 | 2 | experimental grease (LGEP2 grease without additives) + 0.12 wt % antioxidant + 3.21 wt % anti-rust + 0.5 wt % Bi-additives (L-3016) |
| Sample 4 SKF LGEP2 (F11607) | Li-soap | 195 | 15 | 2 | commercial EP grease containing S/P additives |

Note: *special batch prepared by AB Axel Christiernsson

TABLE 3

| Grease sample | Calculated LIFE (hours) (90% confidence interval) | | Weibull slope, β | Number of related failure | |
|---|---|---|---|---|---|
| | L10 | L50 | | Fatigue | Grease |
| Sample 1 | 487.6 (279.7–620.7) | 750.0 (628.5–967.9) | 4.4 | 5 (either inner ring/ball/outer ring) | — |
| Sample 2 | 512.3 (192.7–734.2) | 918.1 (690.9–1436.0) | 3.2 | 1 (inner ring) | 3 |
| SKF LGEP2 (Sample 4) | 244.7 (86.8–383.8) | 546.2 (392.9–878.8) | 2.4 | 2 (inner ring) | 3 |

Figure 2:
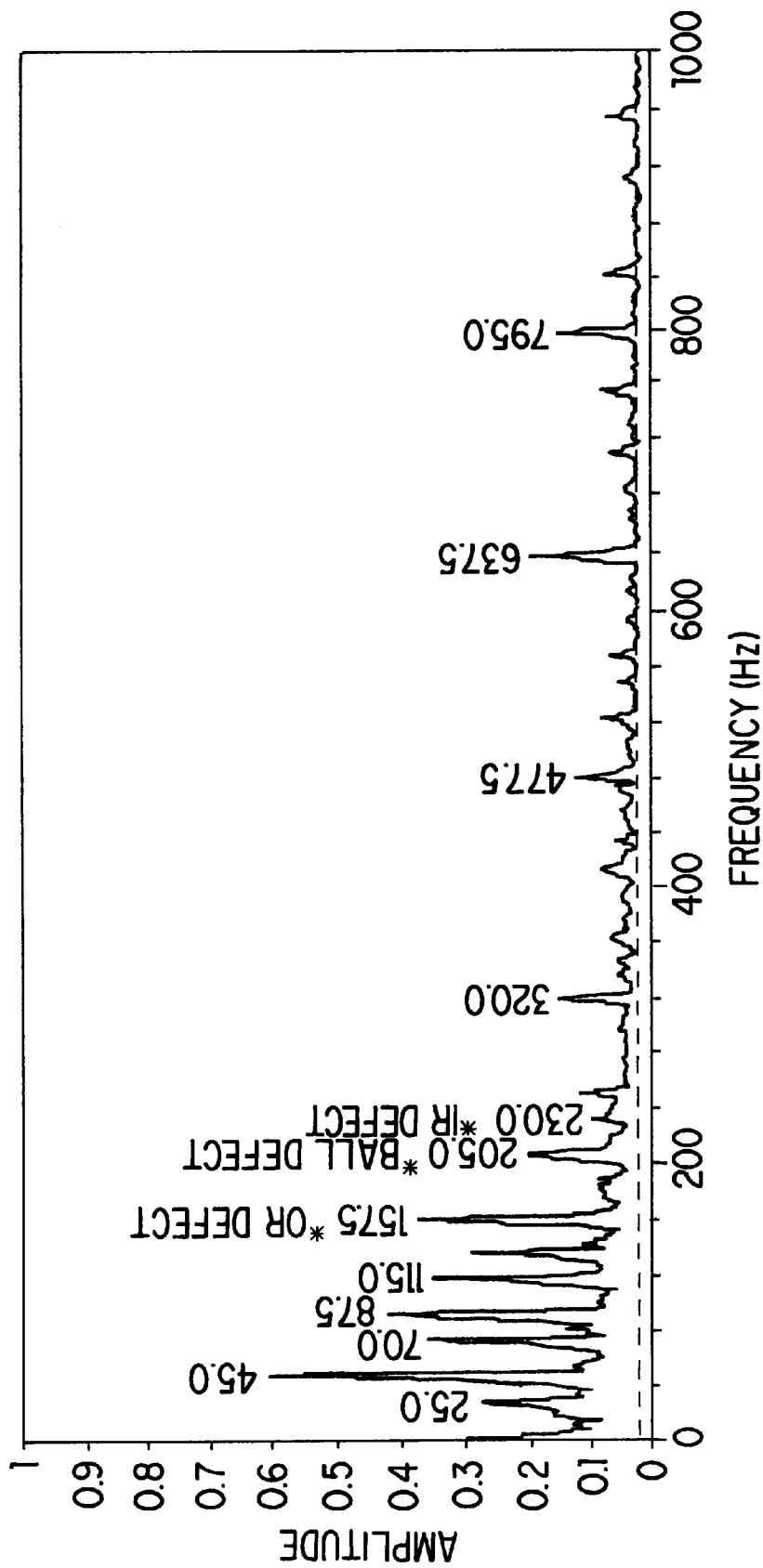
FIG. 2 shows the bearing condition monitoring in a DGBB test
Figure 3:
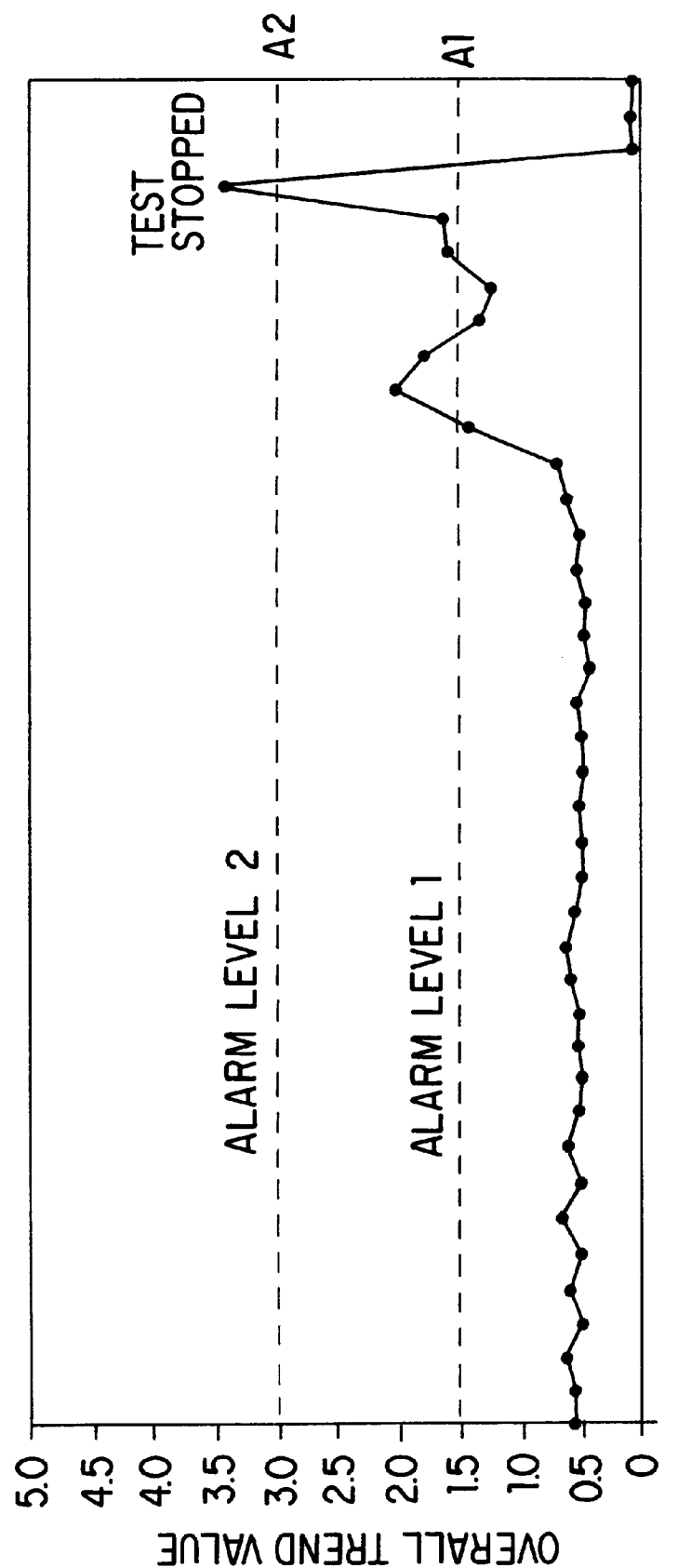
FIG. 3 shows a plot of overall trend value versus test time

In case of bearing test with DGBB's, a complex bearing failure is observed. Some bearings failed due to grease degradation, and some failed due to pitting of ball/inner ring/outer ring (see Table 3). FIG. 2 shows the spectrum plot of a test bearing (#22). It can be seen that the frequency at 205 Hz is due to a ball defect, outer ring defect frequency is at 157 Hz, and the 230 Hz frequency is attributed to inner ring defect. Post investigation of the failed bearing confirmed the spectrum data. In general, all the failed bearings due to rolling contact fatigue were detected and recorded by the SKF CoMo monitoring system. FIG. 3 shows a time trend versus the overall spectrum energy value plot for a bearing (#23). This was the criterion used to terminate the test automatically when the overall value increase to a set alarm level (A2) as shown.

Figure 4:
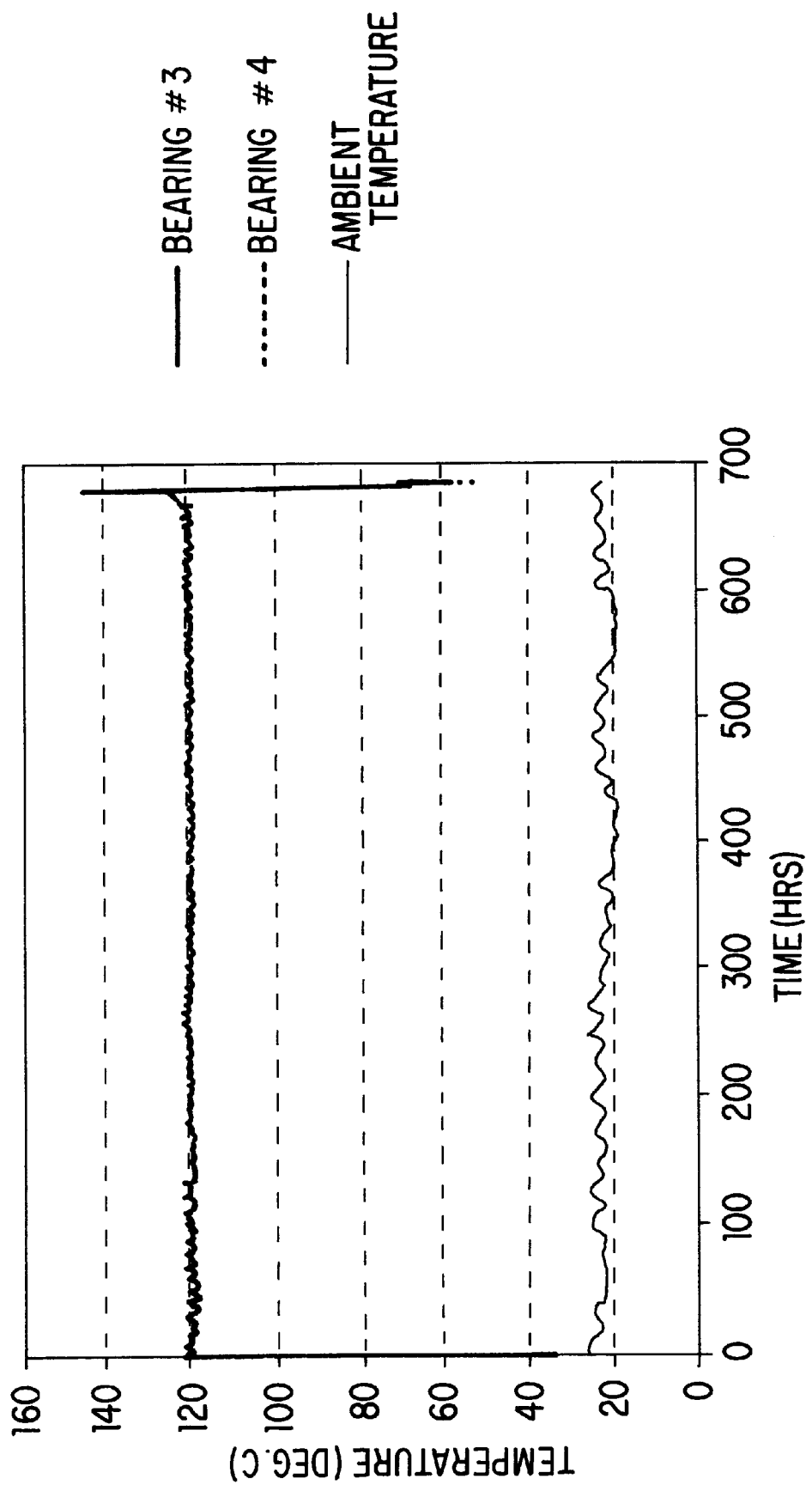
FIG. 4 shows a plot of temperature versus test time

Bearings primarily failing due to "dry-running" can be detected with the continuous temperature measuring system. FIG. 4 illustrates a plot of temperature recorded versus time. The machine of a test group bearings (#3 and #4) stopped due to a sudden increase in temperature of bearing #3 after approximately 680 hours of running.

The difference in grease life observed between LGEP2 and Bi-greases can not solely be attributed to the presence of different additive systems because of many variables which could not be controlled accurately under test conditions e.g. lubricant starvation, amount of "active" grease in bearing after initial grease, channelling etc. It must be noted that thermal and mechanical stress, lubrication oxidation and degradation, oil separation and migration can also greatly influence the grease life and performance.

Post analysis of the failed DGBBs reveals that bearing failure is due to a combination of grease failure (dry-running) and contact fatigue. Interestingly, all bearings tested with Bi-grease sample 1 failed due to spalling, and the bearings tested with the other Bi-grease (sample 2) failed predominantly due to the "dry-running". This suggests that the presenbce of 'active' sulphur additive in grease can induce problems by reducing thermal/oxidation and mechanical stability as well as promoting rolling contact fatigue.

Grease samples 1 and 2 have also been shown to give better shear stability than grease sample 4 containing S/P additive. The poor results for sample 4 are due to the softening of grease structure, resulting an excessive oil leakage from the grease.

The mechanical stability of Bi-greases was evaluated using the SHELL roll stability tester. The results show that under test conditions at 80° C. for 50 hrs, the SKF LGEP2 grease consistency changes from 2 to a fluid-like lubricant softer than '00'. This poor inherent property of the grease is primarily due to the nature of the soap thickener, and, to some extent, of the S/P EP additive package used in the grease. Bi-EP greases showed a significant improvement in the mechanical stability.

To determine the flange-roller wear prevention of bismuth containing lubricant compositions an oil containing an organo-bismuth additive, sample 3, was tested in a SKF R3 test machine. The test conditions are tabulated below
Flange-Roller Contact Test Conditions:
Bearing type: taper roller bearing (580/572);
Speed: 2500 rpm
Test temperature: 75±2° C. (outer ring)
C/P: 2
Kappa: 1.2
Rate of oil supply: at equilibrium 1 liter/min Under these conditions, it was shown that sample 3 prolonges the roller bearing life of flange-roller bearings and avoids the possible adverse effect of an S/P EP additive on fatigue life.

EXAMPLE 2

Preparation of Bismuth Soaps

The bismuth soap is prepared as other metal soaps such as lead soap. This preparation can be carried out in either an open vessel or an autoclave. Normal bismuth base grease can be prepared by:
1. saponification—reaction of bismuth compounds such as bismuth oxides and bismuth hydroxide with chosen acid such as fatty acids or glycerides. Commonly used metal soap types such as bismuth soap of 12-hydroxy stearic acid, bismuth stearate, bismuth oleate are then produced. The soap at this stage contains about 25–50 pertentage of bismuth;
2. dispersion of soap in oil—this is done by adding an oil or oils to the bismuth concentrate at about 150–160° C., after which is cooled (normally while being agitated and for further addition of other additive types) to room temperature;
3. the cooled lubricating grease is then passed through a mill and a filtering system.

The mixed complex bismuth base lubricating greases can also be prepared according to the preparation technology of other metal soaps such as lead or lithium.

EXAMPLE 3

In this example, the functional performance properties of bismuth additives in a polymer-thickened greases was studied.

Bismuth additives have been found to have enormous potential in the formulation of next generation lubricants in replacing (toxic) leaded additives and possibly sulphur-phosphorus EP additives, and anti-wear additives such as ZDTPs. Bismuth (additives) have been considered to be non-toxic and environmental friendly substance.

In this example, bismuth carboxylate additives synthesised in pure form by PCF (Pharmacie Centrale de France S.A.) were compared to the commercial bismuth additives from Miracema, Brazil.

1. Materials used

Table 4 shows the bismuth (Bi) additives employed in the study. The additive types consist of bismuth dithiophosphates, dithiocarbamates and carboxylates. In all physical and oxidation studies, Fina Solna 68 mineral oil was used in test oils and polymer greases. The base oil of polymer grease used in the ROF grease life test was, however, Unichema Priolube 3970 (an ester oil).

As an anti-oxidant, Ciba-Geigy Irganox L-57 was also used in the formulation of test samples when specified. In all formulations involving the use of additives, 1 wt % bismuth of the additive and 1 wt % of the anti-oxidant additive were used, unless otherwise stated.

2. Test Details

The evaluation of physical properties of polymer greases containing Bi-additives have been performed based on Fina Solna 68, a mineral oil, with 11% polymeric thickener as described above. These greases were manufactured according to the preferred process described in U.S. Ser. No. 08/526,175 as indicated above. Details of the test conditions are summarised below.

The wear scar was determined according to DIN 51350/ part 5. The diameter of the scar was measured after 1 minute, applying a load of 1400 N.Mechanical stability was determined by measuring the consistency change after prolonged working, i.e. 100.000 strokes, as described in ISO 2137 and after rolling in the Shell Roller Tester for 24 hrs at 60° C., according to ASTM 1831.

The noise characteristics were evaluated in the SKF BEQUIET grease-noise-tester, using 608 DGBB of QE4 quality in the reference condition.

Corrosion inhibiting properties were assessed according to the SKF EMCOR standard procedure, in the presence of distilled water (DIN 51802).

The oxidation stability of oil (Solna 68) containing bismuth additives was conducted according to the test apparatus described in G. T. Y. Wan, A. v.d. Kommer and H. Lankamp, 'Fourier transform infrared (FTIR) studies of lubricant oxidation and water content', Presented at the 1st International symposium on Tribology, October 18th–23rd, Beijing, China, 1993. at a temperature of 155° C.

The grease service life, in the SKF ROF (110° C. at 20,000 rpm), was determined using polymer greases based on Unichema Priolube 3970, hindered-ester oil, with 11% thickener.

Results

1. Additive pre-selection.

Preliminary tests on the thermal stability or solubility of oils containing Bi-additives at high temperatures, grease noise characteristics, 4-ball wear tests and Shell roll stability tests of 4 bismuth additives produced by PCF were conducted.

Initial results showed that most of the test bismuth additives were thermally unstable at a temperature of 190° C. Additives LC-12, LC-14, IC-18, were the most promising additives for incorporating directly for polymer grease production. Further test results on grease noise characteristics, mechanical stability and 4-ball anti-wear property indicated that two of the bismuth additives i.e. IC-18 and LC-12 were the most suitable additives for use in the invention.

2. Physical/Mechanical and Chemical Properties of Selected Additives.

Figure 5:
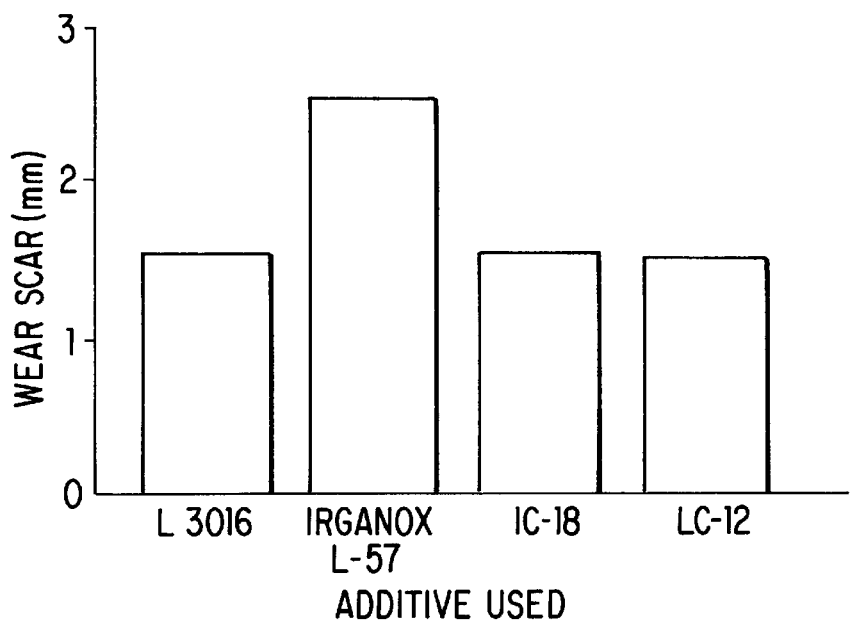
FIG. 5 shows 4-ball wear test data for bismuth additive-containing, polymer-thickened greases.

The anti-wear property of greases containing bismuth additives or anti-oxidant is shown in FIG. 5. It is seen that the anti-oxidant additive, Irganox L-57 gave a higher wear scar compared to the bismuth additives studied. IC-18 showed the same value as L-3016. The grease noise characteristics of several additives have been studied using the SKF BEQUIET grease noise tester (see Table 5). The results show that bismuth additives of IC-18 and L-3016 have excellent low noise property.

Table 6 shows the consistency of the greases produced after 60 strokes, 100,000 strokes and Shell roller test. Most of the additives perform similarly with decreasing consistency after working. Additive LC-12 gave the worst mechanical stability compared to the others.

As can be seen from Table 7, corrosion resistance of all greases containing bismuth additive and or anti-oxidant, although satisfactory, could be improved further by the inclusion of a corrosion inhibitor.

Figure 6:
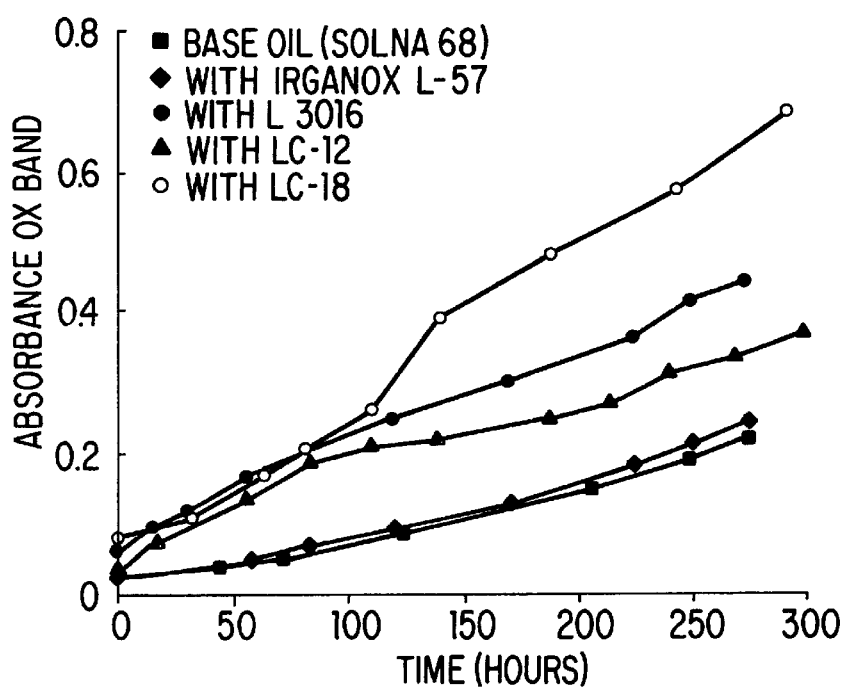
FIG. 6 shows comparative oxidation stability data for bismuth additive-containing, polymer-thickened greases of the invention, with or without anti-oxidant additives.

The oxidation stability of oils containing Bi-additives has been determined as shown in FIG. 6. The data indicate that the base oil and oil+Irganox L-57 gave better oxidation stability than the bismuth carboxylates additives (L-3016, LC-12 and IC-18) in oil.

3. ROF test results.

Figure 7:
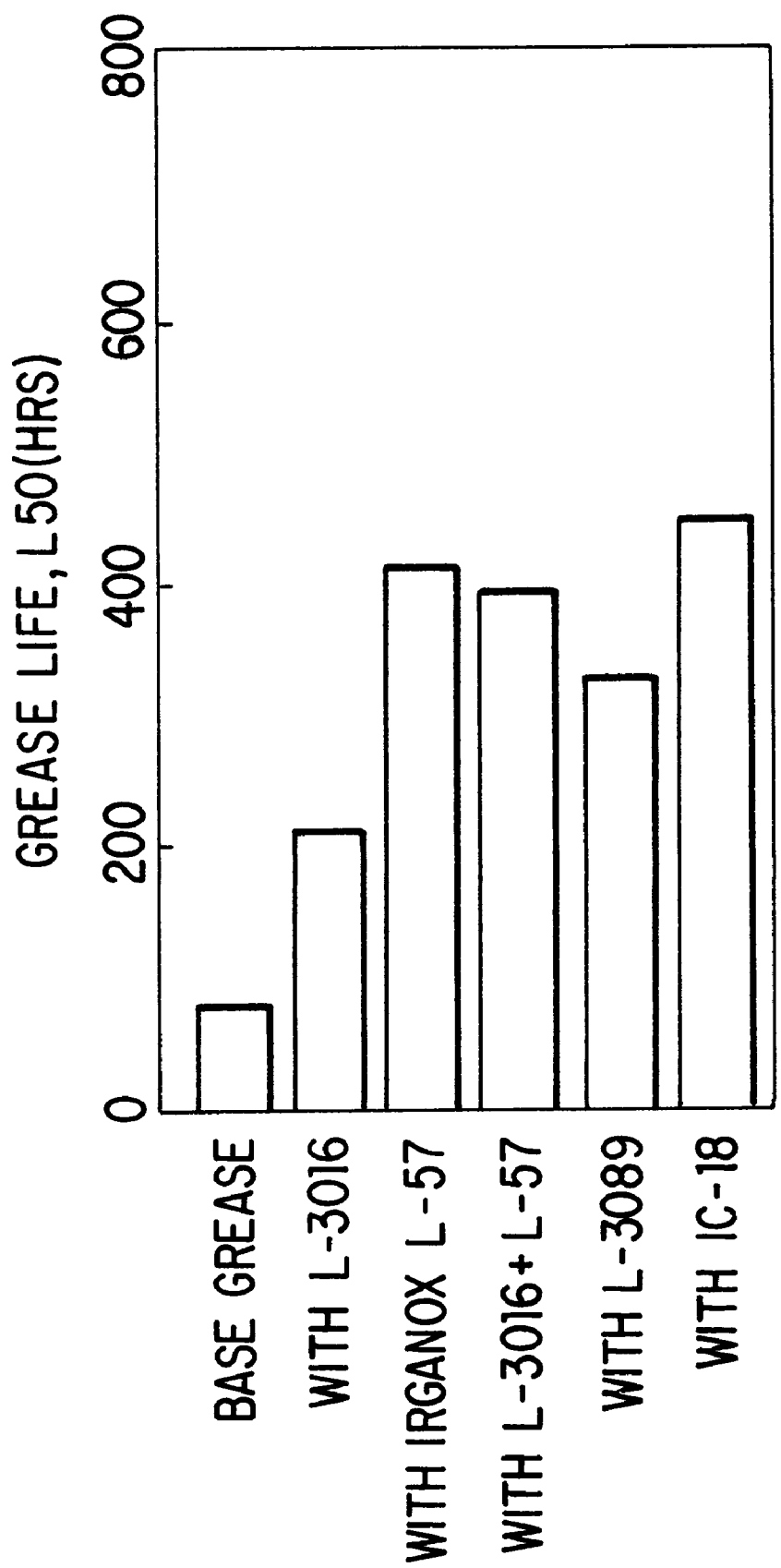
FIG. 7 shows comparative grease life data for the bismuth additive-containing, polymer-thickened greases of the invention.

The grease life test results of all bismuth additives in an experimental polymer grease are shown in FIG. 7. The Weibull slope and the amount of grease remained after test are tabulated in Table 8. These data clearly indicate that addition of antioxidant additive or bismuth additive significantly increases the grease life as evaluated by the statistical method according to the SKF Quality Assurance Manual 1.3.2—significance level, see Table 9. The grease life of bismuth additive IC-18 is significant better than L-3016, a similar commercially available additive i.e. a bismuth carboxylate. There is no significance difference between IC-18 and L-3016+I57. The anti-oxidant additive, Irganox L-57 gave an increase in life similar (no significant difference) to most other Bismuth additives.

From these results, it can be seen that the bismuth carboxylate additives, in particular IC-18 produced by PCF, exhibit some very useful performance characteristics in terms of mechanical stability, anti-wear property and grease life improvement. These additives perform better than the L-3016, a commercial Bi-additive from Miracema. In view of the grease life results and cost, these additives can replace the combined additives of L-3016 and the anti-oxidant additive, Irganox L-57.

For additive IC-18, the other properties measured such as grease mechanical stability, and 4-ball wear test are similar or better than L-3016. IC-18 also shows good noise characteristics.

No direct correlation was observed between oxidation stability and grease life.

With the bismuth additives, anti-corrosion additive can be added for improving the corrosion property.

Increased performance may be reached by combining different bismuth types. Concentration of bismuth additive used should be optimised depending on application conditions within the general limits indicated above.

TABLE 4

Test bismuth additives

| Bismuth Additive | Bismuth Content (%) | Manufacturer |
|---|---|---|
| LC-12 | 24.8 | PCF |
| LC-14 | 22.5 | PCF |
| Bi Sulfide | 81.3 | PCF |
| IC-18 | 16.7 | PCT |
| L-3016 | 14.5 | Muracema Nuodex |
| L-3089 | 7.5 | Miracema Nuodex |

TABLE 5

Results of SKF BEQUIET test on grease noise performance

| Additive | % BQ1 | % BQ2 | % BQ3 | % BQ4 | X |
|---|---|---|---|---|---|
| L-3016 | 81 | 97 | 100 | | |
| Irganox L-57 | 54 | 95 | 99 | 100 | |
| IC-18 | 82 | 96 | 99 | 99 | |
| LC-12 | 4 | 93 | 99 | 100 | |

SKF requirement for low noise applications ≧ 95% BQ2

TABLE 6

Results of grease mechanical stability tests

| | Consistency [$10^{-1}$ mm] Change After | | |
|---|---|---|---|
| Additive Used | 60 strokes | 100,000 strokes | Rolling |
| L-3016 | 260 | 291 | 335 |
| Irganox L-57 | 260 | 292 | 335 |
| IC-18 | 245 | 285 | 335 |
| LC-12 | 245 | 313 | 350 |

TABLE 7

Results of SKF EMCOR test

| Bismuth Additive | Result, visual ratings |
|---|---|
| L-3016 + Irganox L-57 | 2-3* |
| L-3016 | 2-2* |
| Irganox L-57 | 2-2* |
| IC-18 | 2-3* |
| LC-12 | 2-3* |

*slight staining

TABLE 8

Grease life test results

| | Life in SKF ROF test rig: 110° C. at 20.000 rpm | | |
|---|---|---|---|
| Test Grease | Life, $L_{50}$ | b | Residual grease |
| Base grease, no additives | 83 | 3.3 | 74% ± 8 |
| Base grease + L-3016 | 216 | 2.28 | 67% ± 12 |
| Base grease + L-3089 | 328 | 2.31 | 73% ± 4 |
| Base grease + L-3016 + Irganox L-57 | 395 | 5.69 | 61% ± 8 |
| Base grease + Irganox L-57 | 416 | 3.94 | 63% ± 7 |
| Base grease + IC-18 | 446 | 2.86 | 67% ± 6 |

TABLE 9

Significance level - grease life comparison between different additives tested

| Base grease | Base grease | | | | |
|---|---|---|---|---|---|
| with L-3016 | S | with L-3016 | | | |
| with L-57 | S | S | with L-57 | | |
| with L-3016 + L-57 | S | S | NS | with L-3016 + L-57 | |
| with L-3089 | S | NS | NS | NS | with L-3089 |
| with IC-18 | S | S | NS | NS | NS | with IC-18 |

S: significant (90% ≦ confidence level < 95%)
WS: weakly significant (80% ≦ confidence level < 90%)
NS: not significant (confidence, 80%).

EXAMPLE 4

Bismuth additive containing, polymer thickened grease of the invention:

A bismuth additive containing, polymer thickened grease of the invention comprising the following components:

thickener, 12.5 wt. % polymeric thickener according to Ser. No 08/526,175 comprising 1 part by weight high molecular weight polypropylene (average Mw 230,000) to 19 parts by weight low molecular weight polypropylene (average Mw 82,000);

bismuth additive, 6 wt. % bismuth carboxylate IC-18 of PCF (Pharmacie Centrale de France S.A.)

antioxidant: 1 wt. %
Irganox$^R$ L-57 of Ciba-Geigy lubricating base oil: to 100 wt. %
Solna 68 can be prepared essentially as described in Example 1 of Ser. No 08/526,175, by incorporating the Bismuth additive.

The polypropylene thickener components are mixed with the base oil and heated under nitrogen atmosphere until the polymers have dissolved (about 195° C.). The bismuth-additive and antioxidant are added, after which the composition is cooled ("quenched") by pouring it on a water-cooled metal plate. The grease is then "worked" to the required final consistency in a three-roll mill.

For better corrosion properties, 0.5 wt. % Vanlube RI-G can also be incorporated, together with the bismuth additive and the anti-oxidant.

What is claimed is:

1. A method for extending the service life of a rolling element bearing comprising:

preparing a first extreme pressure grease lubricant composition comprising an effective service life extending amount of at least one bismuth-containing compound and being substantially free of sulfur compounds and substantially free of compounds that provide or release free reactive sulfur under bearing operating conditions;

identifying effective service lives of said rolling element bearing treated with said first extreme pressure grease lubricant composition and of said rolling element bearing treated with a second extreme pressure grease lubricant composition, identical to said first extreme pressure grease lubricant composition, except wherein said at least one bismuth-containing compound of said first extreme pressure grease lubricant composition is replaced in said second extreme pressure grease lubricant composition by a non-bismuth-containing compound; and treating said rolling element bearing with said first extreme pressure grease lubricant composition for a period of time at least longer than the effective service life of said second extreme pressure grease lubricant composition, wherein said at least one bismuth-containing compound is an organobismuth compound suitable for use in a grease lubricant composition and is selected from the group consisting of compounds having the formula $(R-CO_2)_3Bi$, wherein R is a branched, straight or cyclic alkyl group with 1–30 carbon atoms or an aryl, alkaryl or aralkyl group with 6–20 carbon atoms.

2. The method according to claim 1, wherein said at least one bismuth-containing compound is an EP additive.

3. A method for extending the service life of a rolling element bearing comprising:

preparing a first extreme pressure grease lubricant composition comprising an effective service life extending amount of at least one bismuth-containing compound and being substantially free of sulfur compounds and substantially free of compounds that provide or release free reactive sulfur under bearing operating conditions;

identifying effective service lives of said rolling element bearing treated with said first extreme pressure grease lubricant composition and of said rolling element bearing treated with a second extreme pressure grease lubricant composition, identical to said first extreme pressure grease lubricant composition, except wherein said at least one bismuth-containing compound of said first extreme pressure grease lubricant composition is replaced in said second extreme pressure grease lubricant composition by a non-bismuth-containing compound; and treating said rolling element bearing with said first extreme pressure grease lubricant composition for a period of time at least longer than the effective service life of said rolling element bearing treated with said second extreme pressure grease lubricant composition, wherein said at least one bismuth-containing compound is an organobismuth compound suitable for use in a grease lubricant composition and is a bismuth salt of a fatty acid having 10 to 30 carbon atoms, or a derivative thereof.

4. The method according to claim 3, wherein said at least one bismuth-containing compound further includes one or more compounds having the formula $(R-CO_2)_3Bi$, wherein R is a branched, straight or cyclic alkyl group with 1–30 carbon atoms or an aryl, alkaryl or aralkyl group with 6–20 carbon atoms.

5. A method for extending the service life of a rolling element bearing comprising treating a rolling element bearing with an extreme pressure grease lubricant composition comprising an effective service life extending amount of at least one bismuth-containing compound and being substantially free of sulfur compounds and substantially free of compounds that provide or release free reactive sulfur under bearing operating conditions, wherein said at least one bismuth-containing compound is an organobismuth compound suitable for use in a grease lubricant composition, and wherein said organobismuth compound is an additive selected from the group consisting of compounds having the formula $(R-CO_2)_3Bi$, wherein R is a branched, straight or cyclic alkyl group with 1–30 carbon atoms or an aryl, alkaryl or aralkyl group with 6–20 carbon atoms.

6. The method according to claim 5, wherein said extreme pressure grease lubricant composition is substantially free of toxic heavy metals and organometallic compounds containing heavy metal atoms.

7. The method according to claim 5, wherein said extreme pressure grease lubricant composition is substantially free of tin and cadmium compounds.

8. The method according to claim 5, wherein said at least one bismuth-containing compound is an EP additive.

9. The method according to claim 5, wherein said treating is conducted under operating conditions of high bearing (outer ring) temperatures of from about 80 to about 130° C., and one of (a) high contact stress of C/P from about 2 to about 15 and normal bearing rating speeds or (b) high bearing speeds of from about 700,000 to about 1.5 million NDM and low load of C/P greater than about 15.

10. The method according to claim 5, wherein said extreme pressure grease lubricant composition further comprises a polymeric thickener comprising a high molecular weight portion having a weight average molecular weight of greater than about 200,000 and a low molecular weight portion having a weight average molecular weight of less than about 100.000.

11. The method according to claim 10, wherein said high molecular weight portion comprises a propylene homopolymer or propylene copolymer and said low molecular weight portion comprises a propylene homopolymer or propylene copolymer.

12. The method according to claim 10, wherein a weight ratio of said high molecular weight portion to said low molecular weight portion is from about 1:40 to about 1:5.

13. The method according to claim 10, wherein said extreme pressure grease lubricant composition is prepared by mixing said polymeric thickener with a lubricating base oil at a temperature above the melting point of the polymeric thickener, and cooling said grease lubricant composition.

14. The method according to claim 13, wherein said cooling step comprises rapidly cooling the grease lubricant composition to about room temperature over a period of from about 1 second to about 3 minutes.

15. An extreme pressure grease lubricant composition for rolling element bearings, comprising a lubricant base oil, a polymeric thickener and an effective service life extending amount of at least one bismuth-containing compound, wherein the composition is substantially free of sulfur compounds and substantially free of compounds that provide or release free reactive sulfur under bearing operating conditions, wherein said at least one bismuth-containing compound is an organobismuth compound suitable for use in a grease lubricant composition and is selected from the group consisting of compounds having the formula $(R-CO_2)_3Bi$, wherein R is a branched, straight or cyclic alkyl group with 1–30 carbon atoms or an aryl, alkaryl or aralkyl group with 6–20 carbon atoms, and wherein said polymeric thickener comprises a high molecular weight portion comprising a propylene homopolymer or propylene copolymer and having a weight average molecular weight of greater than about 200,000 and a low molecular weight portion comprising a propylene homopolymer or propylene copolymer and having a weight average molecular weight of less than about 100,000, wherein a weight ratio of said high molecular weight portion to said low molecular weight portion is from about 1:40 to about 1:5.

16. The extreme pressure grease lubricant composition according to claim 15, wherein said at least one bismuth-containing compound is an EP additive.

17. The extreme pressure grease lubricant composition according to claim 15, wherein said extreme pressure grease lubricant composition is prepared by mixing said polymeric thickener with said lubricating base oil at a temperature above the melting point of the polymeric thickener, and cooling said grease lubricant composition.

18. The extreme pressure grease lubricant composition according to claim 17, wherein said cooling step comprises rapidly cooling the grease lubricant composition to about room temperature over a period of from about 1 second to about 3 minutes.

19. The extreme pressure grease lubricant composition according to claim 15, wherein said extreme pressure grease lubricant composition is substantially free of toxic heavy metals and organometallic compounds containing heavy metal atoms.

20. The extreme pressure grease lubricant composition according to claim 15, wherein said extreme pressure grease lubricant composition is substantially free of tin and cadmium compounds.

21. A method for extending the service life of a rolling element bearing comprising treating a rolling element bearing with an extreme pressure grease lubricant composition comprising an effective service life extending amount of at least one bismuth-containing compound and being substantially free of sulfur compounds and substantially free of compounds that provide or release free reactive sulfur under bearing operating conditions, wherein said at least one bismuth-containing compound is an organobismuth compound suitable for use in a grease lubricant composition, and wherein said organobismuth compound is a soap thickener selected from the group consisting of bismuth salts of a fatty acid having 10 to 30 carbon atoms or a derivative thereof.

22. The method according to claim 21, wherein said at least one bismuth-containing compound further includes one or more compounds having the formula $(R-CO_2)_3Bi$, wherein R is a branched, straight or cyclic alkyl group with 1–30 carbon atoms or an aryl, alkaryl or aralkyl group with 6–20 carbon atoms.

23. An extreme pressure grease lubricant composition for rolling element bearings, comprising a lubricant base oil, a polymeric thickener and an effective service life extending amount of at least one bismuth-containing compound, wherein the composition is substantially free of sulfur compounds and substantially free of compounds that provide or release free reactive sulfur under bearing operating conditions, wherein said at least one bismuth-containing compound is an organobismuth compound suitable for use in a grease lubricant composition and is a soap thickener selected from the group consisting of bismuth salts of a fatty acid having 10 to 30 carbon atoms or a derivative thereof, and wherein said polymeric thickener comprises a high molecular weight portion comprising a propylene homopolymer or propylene copolymer and having a weight average molecular weight of greater than about 200,000 and a low molecular weight portion comprising a propylene homopolymer or propylene copolymer and having a weight average molecular weight of less than about 100,000, wherein a weight ratio of said high molecular weight portion to said low molecular weight portion is from about 1:40 to about 1:5.

24. The extreme pressure grease lubricant composition according to claim 23, wherein said at least one bismuth-containing compound further includes one or more compounds having the formula $(R-CO_2)_3Bi$, wherein R is a branched, straight or cyclic alkyl group with 1–30 carbon atoms or an aryl, alkaryl or aralkyl group with 6–20 carbon atoms.

* * * * *